United States Patent [19]
Miyazaki et al.

[11] Patent Number: 5,613,009
[45] Date of Patent: Mar. 18, 1997

[54] METHOD AND APPARATUS FOR CONTROLLING VIBRATION

[75] Inventors: Toshihiro Miyazaki, Kodaira; Kazutomo Murakami, Yokohama; Keiichiro Mizuno, Tokyo, all of Japan

[73] Assignee: Bridgestone Corporation, Tokyo, Japan

[21] Appl. No.: 166,962

[22] Filed: Dec. 15, 1993

[30] Foreign Application Priority Data

Dec. 16, 1992 [JP] Japan .................................. 4-354587

[51] Int. Cl.$^6$ .......................... A61F 11/06; H04B 15/00
[52] U.S. Cl. ........................................... 381/71; 381/94
[58] Field of Search ................. 381/94, 71; 267/140.14, 267/140.15

[56] References Cited

U.S. PATENT DOCUMENTS

| | | | |
|---|---|---|---|
| 4,677,677 | 6/1987 | Eriksson | 381/71 |
| 5,018,202 | 5/1991 | Takahashi et al. | 381/71 |
| 5,337,366 | 8/1994 | Eguchi et al. | 381/71 |

FOREIGN PATENT DOCUMENTS 406167986   6/1994   Japan ...................... 381/71

OTHER PUBLICATIONS

The Cancellation of Repetitive Noise and Vibration; Barrie Chaplin; 12–80; p. 182.
The Application of Self–Tuning Control Strategies to the Active Reduction of Sound.

*Primary Examiner*—Edward L. Coles, Sr.
*Assistant Examiner*—Jerome Grant, II
*Attorney, Agent, or Firm*—Sughrue, Mion, Zinn, Macpeak & Seas

[57] ABSTRACT

Disclosed is a vibration control method being largely effective in vibration-proof even when a natural frequency is relatively low and its transmissibility of vibration is high and being thus effective in reducing vibration in a wide range of frequencies; and its apparatus. In the above method, vibration information of a vibration source as a reference signal and vibration information of a vibration-proof object as an error signal are inputted into an adaptive filter. The reference signal is processed by regenerating a filter coefficient on the basis of adaptive algorithm, to form a feedforward signal. In the other hand, vibration information of the vibration-proof object is inputted in a feedback calculating means, and a feedback control signal is formed on the basis of a feedback control rule. The feedforward control signal and the feedback control signal are synthesized, to form a drive signal for a vibration exciting means. The vibration exciting means is thus controlled and driven on the basis of the drive signal.

8 Claims, 8 Drawing Sheets

METHOD AND APPARATUS FOR CONTROLLING VIBRATION

BACKGROUND OF THE INVENTION

1. Field of the Invention

The present invention relates to a method and an apparatus for controlling vibration, and particularly, a method and an apparatus for controlling vibration which is capable of reducing the vibration of a substance caused by vibration reverse from a vibration source by exciting a vibration to the above transmitted vibration by means of a vibration exciter.

2. Description of the Related Art

As a vibration control method of this type, there is known a technique of reducing a vibration on the basis of a feedforward signal using an adaptive filter in which vibration information of a vibration source is taken as a reference input and vibration information of a vibration-proof object is taken as an error input.

FIG. 1 is a view showing the construction of this prior art vibration controller.

For vibration, six degrees of freedom must be taken into account; however, herein, only one directional component will be examined for simplification.

A vibration-proof object 2 such as a precision instrument is supported on a ground 1 through an equivalent supporting system 3 which equivalently supports the vibration-proof object 2 by a spring and a damper.

A vibration exciting actuator 4 is additionally provided on the vibration-proof object 2 for forcibly applying vibration to the vibration-proof object 2.

A vibration sensor 5 for detecting a vibration transmitted from a vibration source is provided on the ground 1, and a vibration sensor 6 for detecting a vibration of the vibration-proof object 2 is provided on the vibration-proof object 2.

On the other hand, a feedforward controller 10 for outputting a drive signal to the vibration exciting actuator 4 uses an adaptive filter 11, and which updates a filter coefficient by the FX algorithm of a filtered-X LMS 12.

Detection signals from the vibration sensors 5 and 6 are amplified by amplifiers 17 and 18 and are converted into digital signals by AD converters 15 and 16, respectively. The converted digital signals are inputted in the feedforward controller 10. A drive signal is then outputted from the adaptive filter 11, and is converted into an analog signal by a DA converter 19. The converted analog signal is amplified by an amplifier 20 and is inputted in the vibration exciting actuator 4, to thus drive the vibration exciting actuator 4.

The calculation necessary for the vibration control by the above adaptive filter is shown as follows:

$$y_F(n+1) = \sum_{i=0}^{N-1} w_i x(n-i) \quad (1)$$

$$r(n) = \sum_{i=0}^{M-1} p_i x(n-i) \quad (2)$$

$$\hat{P} = [p_0 p_1 \ldots p_{M-1}]^T \quad (3)$$

$$w_i(n) = w_i(n-1) - 2\mu e(n) r(n-i) \quad (4)$$

In the above expressions (1) to (4), $W_i$ (i=0, 1, 2, ..., N1) is a filter coefficient of the adaptive filter; $x(n)$ is a sample value of the vibration information of a vibration source as a reference input to the adaptive filter at a time n; $y_F(n)$ is an output value from the adaptive filter; $P_i$ (i=0, 1, 2, ..., M1) is a value approximated by discretion of an impulse response of an acceleration on the vibration-proof object 2 with respect to the input of the vibration exciting actuator 4, which is previously measured; $\mu$ in the expression (4) is a convergence parameter and is usually selected to be a number between 0 and 1; and $e(n)$ is a sample value of the vibration information of the vibration-proof object 2 as an error signal at a time n.

The number of the filter coefficients in the expression (2) are dependent on the length of the impulse response of the actual actuator and the vibration-proof supporting system. For example, in the vibration system with a low natural frequency such as a vibration removing base, since the impulse response is long, a large number M of the filter coefficients are required. As a result of which the calculation amount is enlarged as a whole.

The effect of the reduction in vibration is shown in FIG. 2. As is apparent from this figure, the transmitted periodic vibration component can be relatively effectively reduced; however, generally, the characteristic frequency of the vibration system is difficult to be reduced.

SUMMARY OF THE INVENTION

Taking the above circumstances into consideration, the present invention has been made, and its object is to provide a method and an apparatus for controlling vibration, which is practically applied to any kind of vibration transmitted from the outside to a vibration-proof object with a relatively low natural frequency.

To achieve the above object, according to the present invention, there is provided a vibration control method of applying a vibration to a vibration-proof object supported through a vibration-proof supporting means by a vibration exciting means for canceling a vibration transmitted from a vibration source, thereby reducing the vibration. In the above method, vibration information of the vibration source as a reference signal and vibration information of the vibration-proof object as an error signal are inputted into an adaptive filter. The reference signal is processed by updating a filter coefficient on the basis of adaptive algorithm, to form a feedforward control signal. In other hand, vibration information of the vibration-proof object is inputted in a feedback calculating means, and a feedback control signal is formed on the basis of a feedback control rule. The feedforward control signal and the feedback control signal are synthesized, to form a drive signal. The vibration exciting means is thus controlled and driven on the basis of the drive signal.

By synthesizing the control mainly for a periodic vibration by the adaptive filter, and the control for a natural frequency by the feedback control, it is possible to obtain a large control effect without increasing the calculation amount so much.

DETAILED DESCRIPTION OF THE PREFERRED EMBODIMENT

Hereinafter, one preferred embodiment of the present invention will be described with reference to FIGS. 3 to 6.

Figure 1:
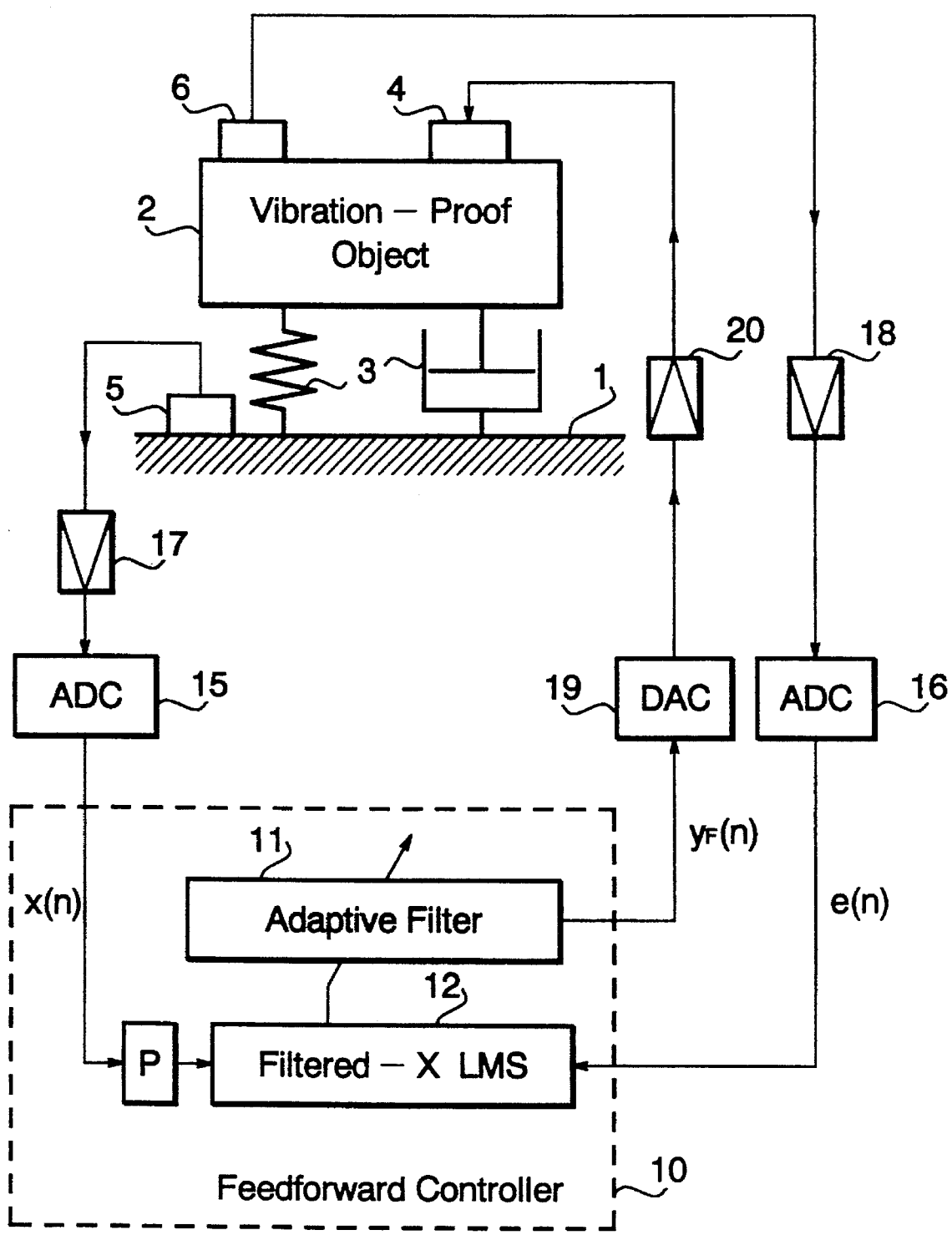
FIG. 1 is a view showing the construction of a prior art vibration controller.
Figure 2:
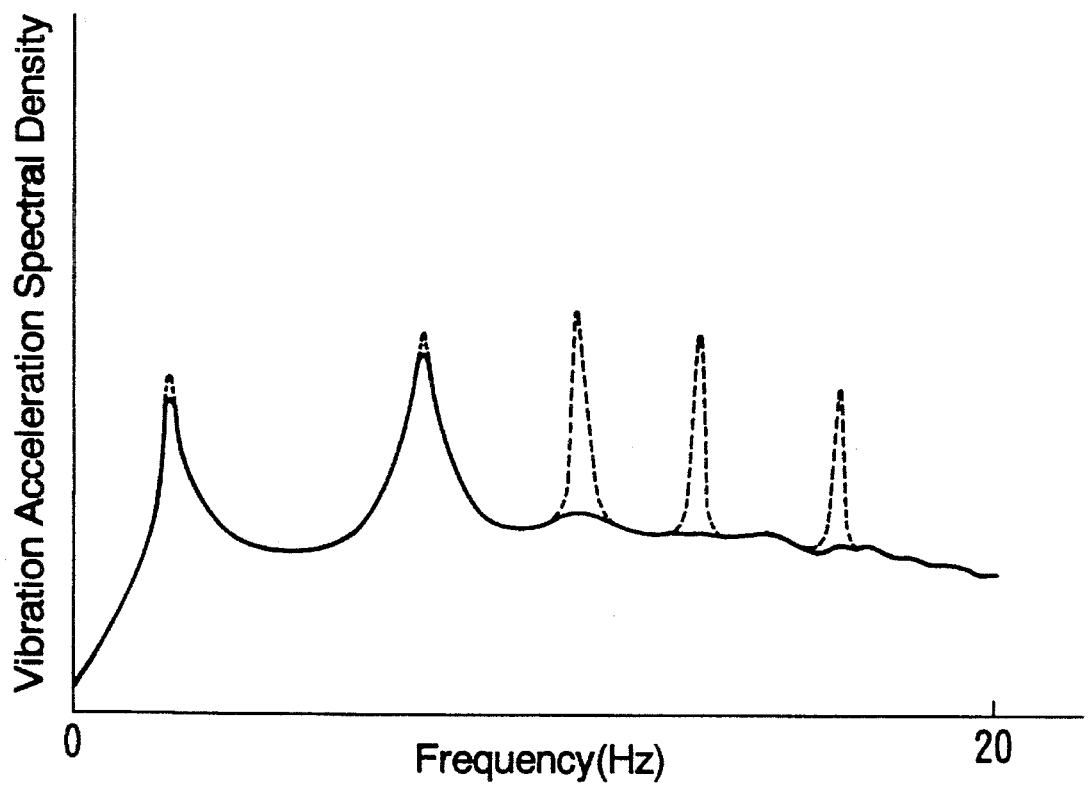
FIG. 2 is a diagram showing the vibration acceleration spectral density to the frequency in the controller in FIG. 1.

A vibration system and a feedforward control unit are the same as those in the prior art which is shown in FIG. 1, and corresponding parts are indicated using the same symbols.

This embodiment includes a feedback control unit 30 in addition to the feedforward control unit 10.

In the feedback control unit 30, a feedback calculating means 31 receives an error signal e(n) from the vibration sensor 6, performing the calculation on the basis of a feedback control rule, and outputs a feedback control signal $y_B$ (n)

The feedforward control signal $y_F$ (n) as the output from the adaptive filter 11 and the feedback control signal $y_B$ (n) are mixed by a synthetic means 32, to form a final drive signal. The drive signal is inputted in the vibration exciting actuator 4 through the DA converter 19 and the amplifier 20, to drive the vibration exciting actuator 4.

The feedback calculating means 31 is intended to perform the calculation on the constant coefficient previously designed, and to perform the calculation on the feedback control suitably designed on the basis of the transfer function of the vibration system subjected to suitable modeling.

The calculating expressions are shown as follows:

$$z(n+1) = A_z(n) + B_u(n) \quad (5)$$

$$y_B(n+1) = C_z(n) + D_u(n) \quad (6)$$

$$A = \begin{bmatrix} a_{11} a_{12} & \cdots & a_{1k} \\ \cdot & & \cdot \\ \cdot & & \cdot \\ \cdot & & \cdot \\ a_{k1} a_{k2} & \cdots & a_{kk} \end{bmatrix} \quad (7)$$

$$B = [b_1 b_2 \ldots b_k]^T \quad (8)$$

$$C = [c_1 c_2 \ldots c_k]^T \quad (9)$$

$$D = d_1 \quad (10)$$

$$z(n) = [z_1 z_2 \ldots z_k]^T \quad (11)$$

The above feedback coefficients as constant coefficients are designed by an LQ controller, LQG controller and H ∞ controller design method using a linear secondary regulator design method in the control theory.

On the basis of the feedback control rule designed as described above, one component $y_B(n)$ of the output signal from the controller is calculated according to the expressions (5) and (6) through a state variables z(n).

Here, A, B, C and D are matrices for expression of the state space of the controller.

In these expression, the controller is expressed as the state space region; however, such a calculation form as shown in the following expression (12) can be made by suitably converting the state space region into a transfer function region.

$$y_B(n) = \sum_{l=0}^{L-1} \alpha_l x(n-l) + \sum_{l=0}^{L-1} \beta_l y_B(n-l) \quad (12)$$

where ($\alpha_l$=0, 1, . . . , L–1) and ($\beta_l$=0, 1, . . . , L–1) are coefficients obtained by transferring the controllers in the expressions (5) to (11) in the transfer function region.

Figure 4:
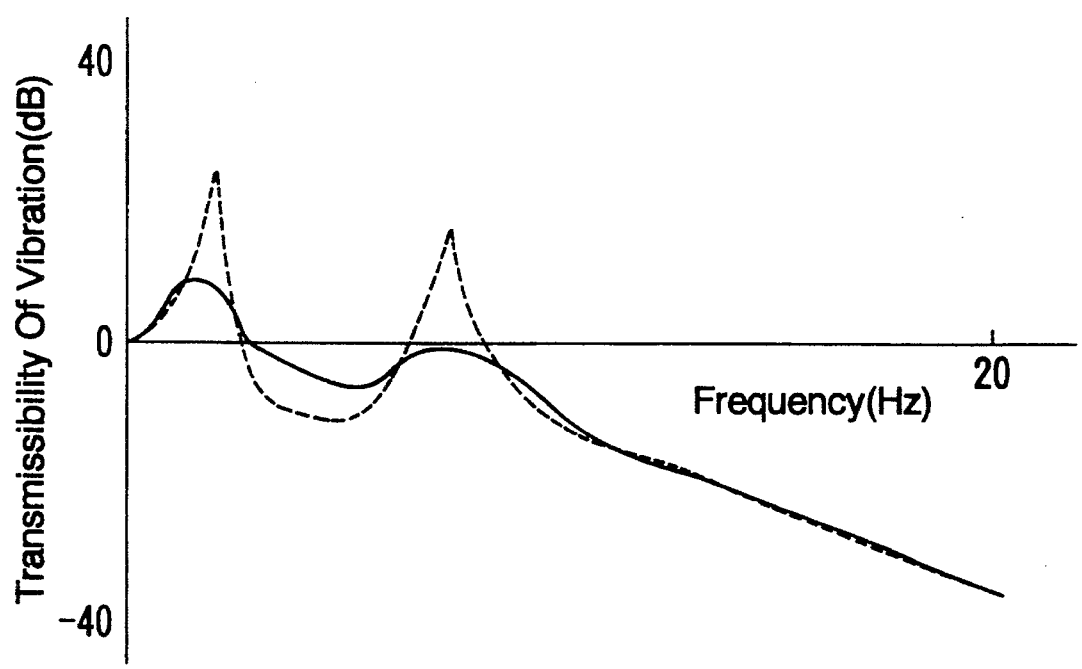
FIG. 4 is a diagram showing a transmissibility of vibration to the frequency in the controller in FIG. 3.

By design of the controller described above, the transfer function of the vibration system in the frequency region is, as shown in FIG. 4, improved in the transmissibility of vibration in the natural frequency.

Figure 5:
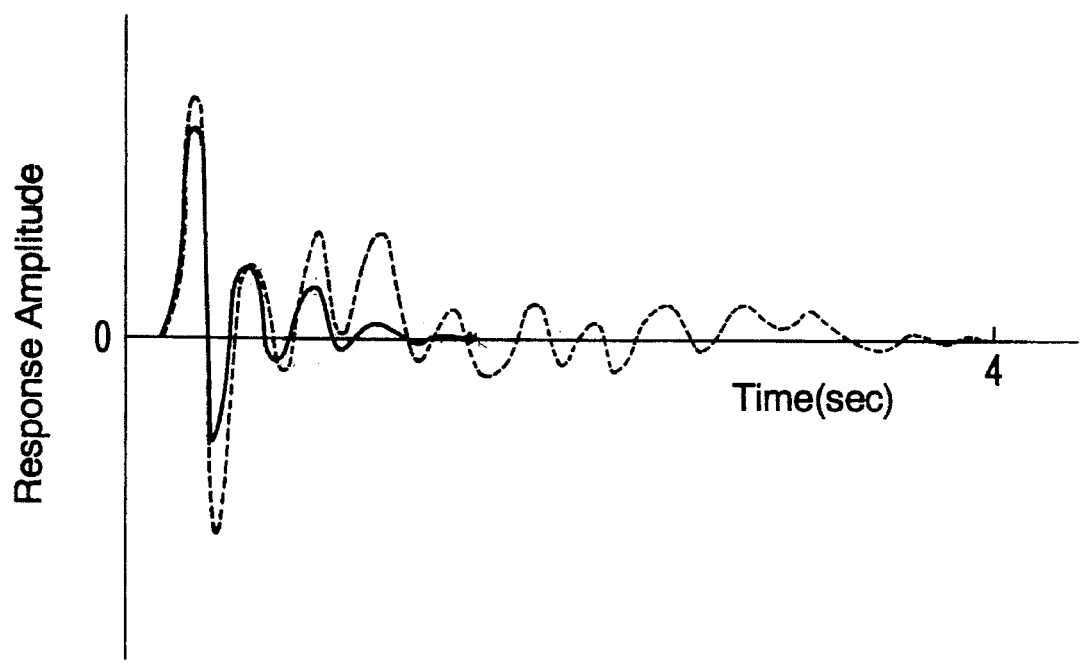
FIG. 5 is a diagram showing the change in the response amplitude in the controller in FIG. 3.

At this time, the impulse response of the transmission characteristic of the vibration exciting actuator 4 in this vibration system is changed from the response shown as the broken line in FIG. 5 to the response shown as the solid line in FIG. 5, in which the response is shortened in terms of time.

After the above feedback control is performed, $p_i$ in the expression (2) as the coefficient necessary for calculation of the adaptive filter is calculated, so that the impulse response is shortened in terms of time as compared with the state in which the feedback control is not added. This makes it possible to reduce the number M of the coefficients of P as the discretion of the impulse response, and hence to reduce the calculation in the expression (2).

By calculation using the reduced number of filter coefficients p, it is possible to reduce the calculation amount as a whole, and to execute the calculation of the adaptive filter without little increasing the calculation amount and the calculation on the basis of the constant coefficient feedback rule.

Finally, the above $y_B$ (n) and $Y_F$ (n) are mixed to be outputted.

In the adaptive filter 11, the coefficient is usually adaptive on the basis of the coefficient updating expression called as Filtered-X LMS.

Consequently, the periodic vibration component mainly transmitted from the ground 1 to the vibration-proof object 2 is effectively suppressed.

Figure 6:
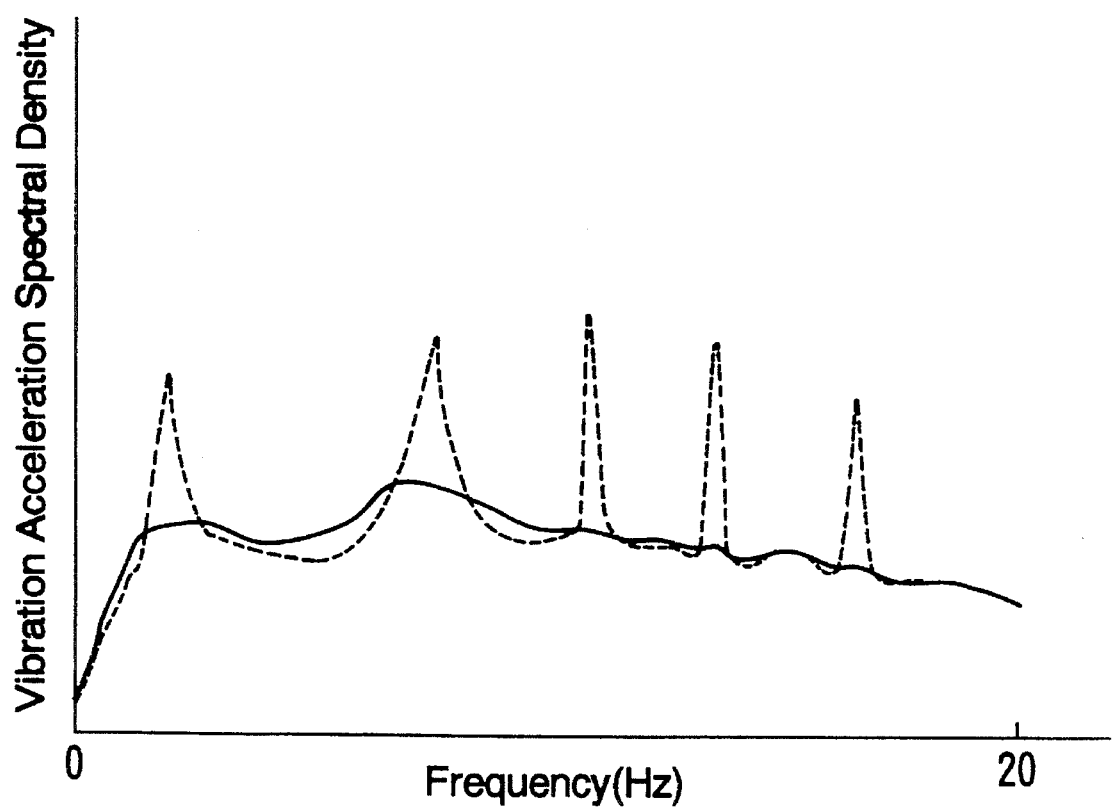
FIG. 6 is a diagram showing the vibration acceleration spectral density to the frequency in the controller in FIG. 3.

FIG. 6 shows the example of the control effect in the case that the vibration controller of the present invention is used.

As is apparent from this figure, the vibration in the natural frequency of the vibration system is reduced by the feedback control, and the periodic vibration transmitted from a floor is reduced by the adaptive filter.

Figure 7:
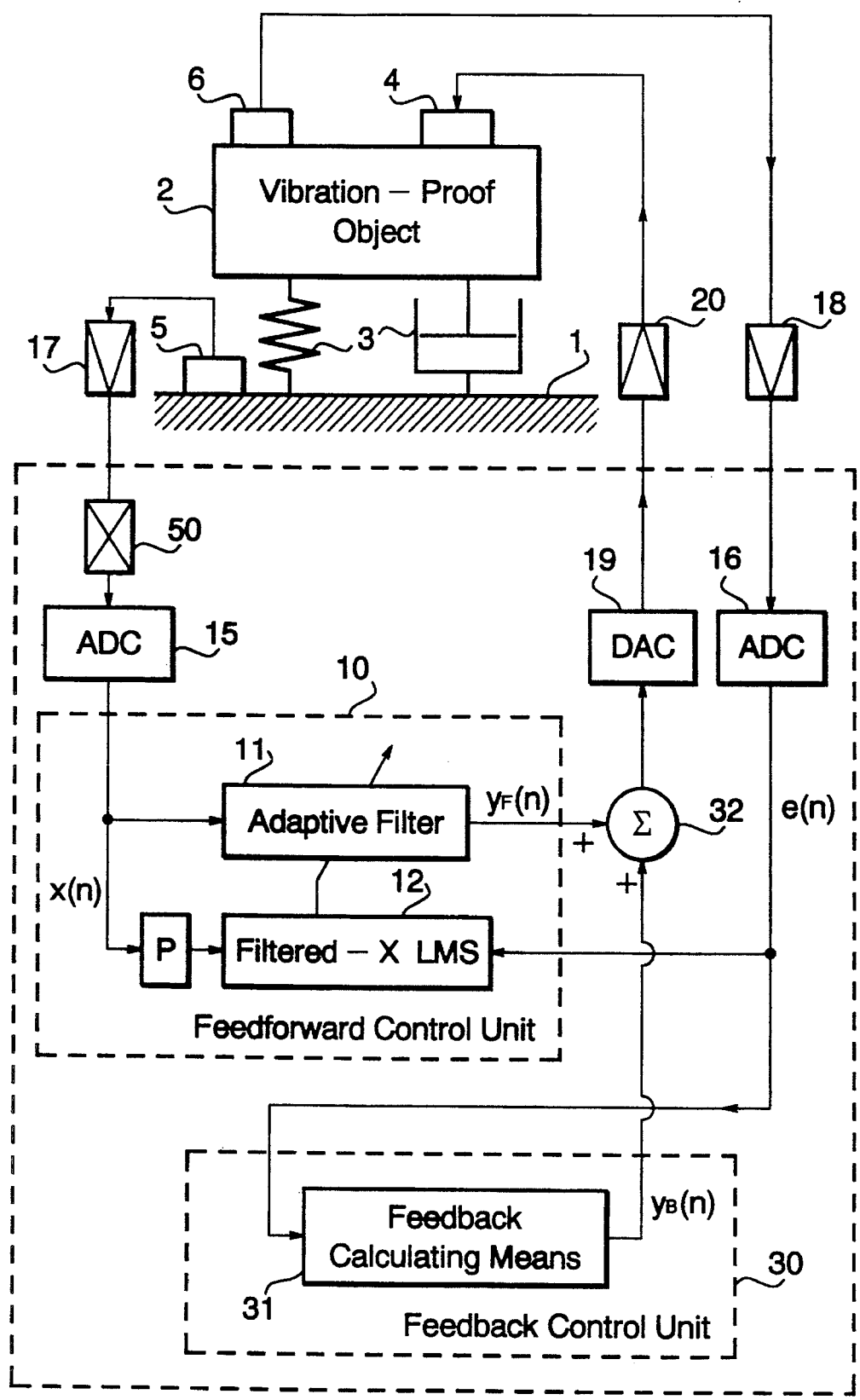
FIG. 7 is a view showing the construction of a vibration controller of another embodiment according to the present invention.

Next, a second preferred embodiment of the present invention will be described with reference to FIG. 7. In this embodiment, the detection signal inputted from the vibration system to the feedforward controller 10 is processed using an analog frequency filter.

Figure 3:
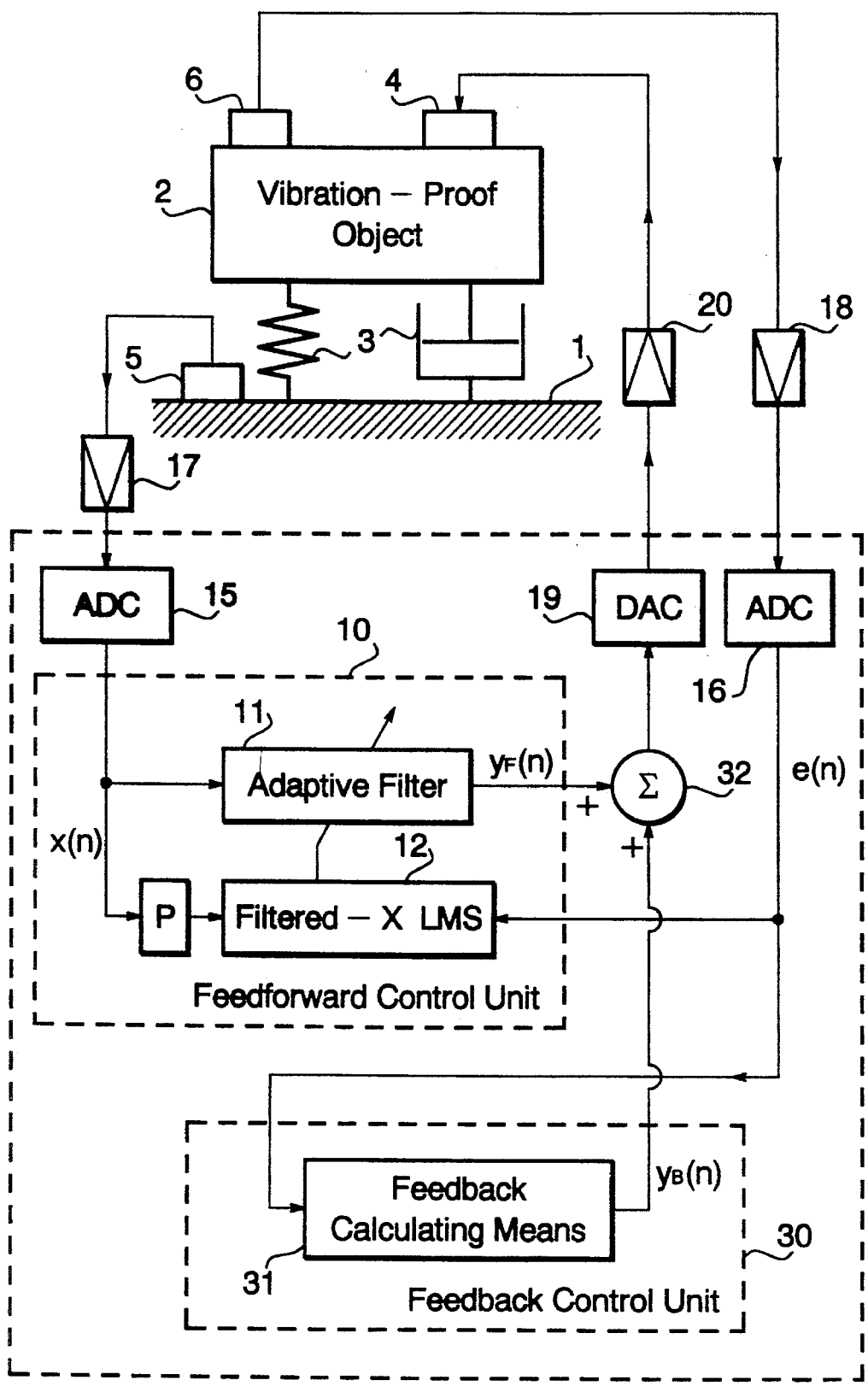
FIG. 3 is a view showing the construction of a vibration controller of one embodiment according to the present invention.

The fundamental construction of the control system is the same as that of FIG. 3, and corresponding parts are indicated using the same symbols.

An analog detection signal from the vibration sensor 5, which is an acceleration sensor, for detecting vibration of the ground 1 is amplified by the amplifier 17 and then goes to an analog frequency filter which passes only a signal of predetermined frequency region. The passed signal is converted into a digital signal by the AD converter 15 and inputted in the feedforward controller 10.

A band-pass filter, a low-pass filter or a high-pass filter capable of passing only predetermined frequencies can be used as the analog frequency filter 50.

By providing such an analog frequency filter, an adaptive filter which controls only transmitted vibration of desired frequency region among vibration components of the ground 1 detected by the vibration sensor 5 can be formed.

Figure 8:
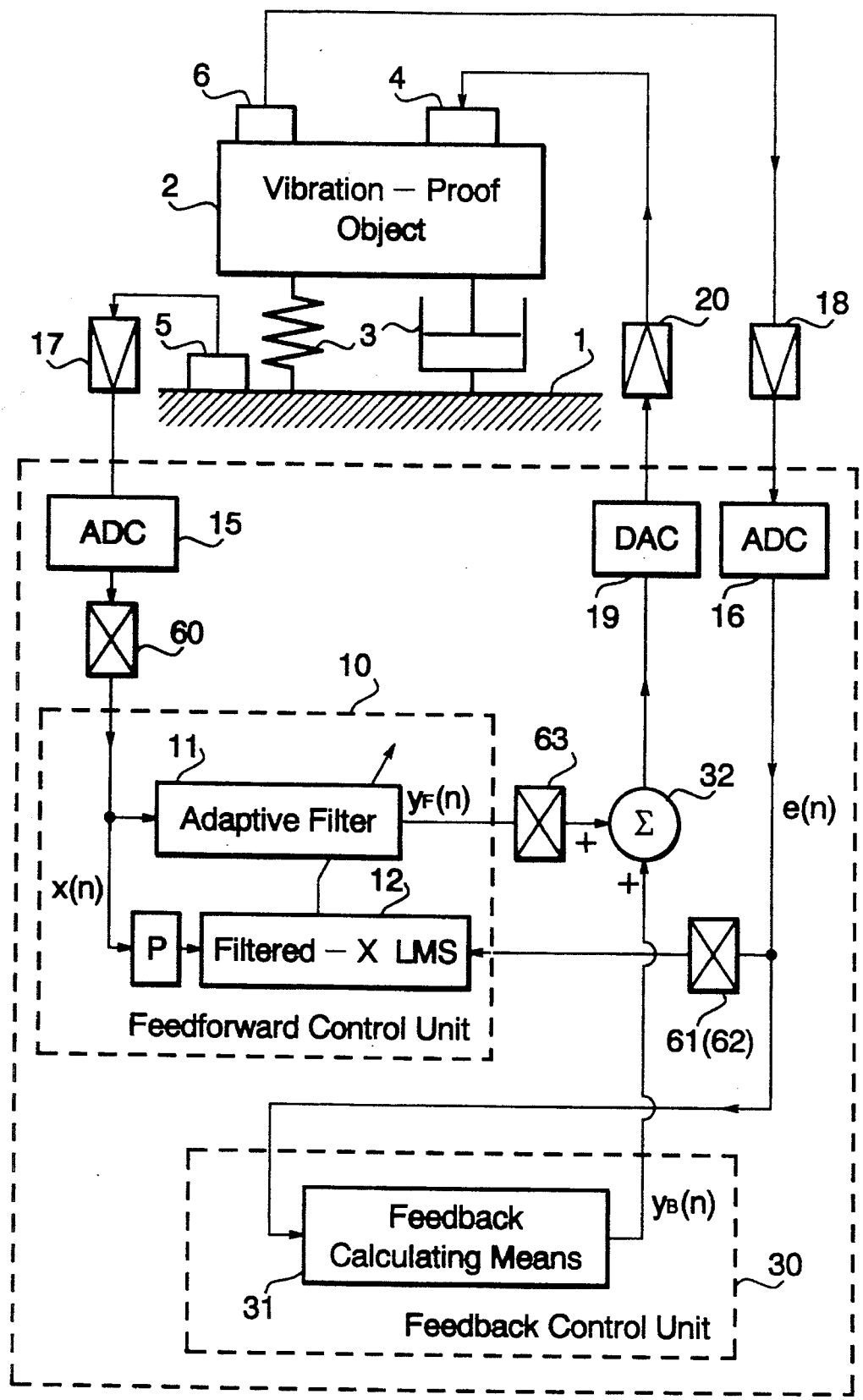
FIG. 8 is a view showing the construction of a vibration controller of still another embodiment according to the present invention.

FIG. 8 shows a third preferred embodiment in which the detection signal inputted from the vibration system into the feedforward controller 10 and the control signal outputted from the feedforward controller 10 are processed using digital frequency filters or the like.

In this embodiment is also the fundamental construction is same as that of above-mentioned embodiments. The analog frequency filter 50 of FIG. 7 has been replaced by a digital frequency filter 60 provided at down stream side of the AD converter 15. The detection signal from the vibration sensor 5 for detecting vibration of the ground 1 is amplified by the amplifier 17, converted into a digital signal by the AD converter 15, and then only signal of predetermined frequency region is inputted into the feedforward controller 10 through the digital frequency filter 60.

Thus, an adaptive filter which controls only the transmitted vibration of the desired frequency region among vibration components of the ground 1 can be formed.

A band-pass filter, a low-pass filter or a high-pass filter capable of passing only predetermined frequencies can be used as the digital filter 60.

On the other hand, the analog detection signal from the vibration sensor 6, which is an acceleration sensor, for detecting vibration of the vibration-proof object 2 is amplified by the amplifier 18 and converted into a digital signal by the AD converter 16. After that, only a signal of predetermined frequency region is inputted into the feedforward controller 10 through a digital frequency filter provided at the input root to the feedforward controller 10.

A band-pass filter, a low-pass filter or a high-pass filter can be used as the digital frequency filter 61. By virtue of the digital frequency filter 61, an adaptive filter which positively makes small vibration of predetermined frequency region among vibration components of the vibration-proof object 2 detected by the vibration sensor 6 can be formed.

The digital frequency filter 61 may be replaced by a twice integrator 62.

Since the vibration sensor 6 detects vibration accelerations of the vibration-proof object 2, the twice integrator 62 integrates the vibration acceleration two times to convert acceleration signal into displacement signal.

Therefore, an adaptive filter which makes vibration displacement of the vibration-proof object 2 small is formed.

Since vibration displacements appear remarkably on an object vibrating slowly and largely, use of the twice integrator is effective when the vibration-proof object 2 vibrates as such principally.

As for the feedforward control signal $y_F(n)$ from the adaptive filter 11 in the feedforward controller 10, only a signal of predetermined frequency region passes through a digital frequency filter 63 and is synthesized with the feedback control signal $y_B(n)$ from the feedback controller 30 by the synthetic means 32. The synthesized signal is converted into an analog signal by the DA converter 19, amplified by the amplifier 20 and inputted to the vibration exciting actuator 4 to drive it.

A band-pass filter, a low-pass filter or a high-pass filter which passes only signal of desired frequency region is used as the digital frequency filter 63.

By insertion of the digital frequency filter 63, among the feedforward control signals $y_F(n)$, only signal of frequency region determined by the digital frequency filter 63 is synthesized with the feedback control signals $y_B(n)$ to form the control signal for driving and controlling the vibration exciting actuator 4. Therefore it is possible to regulate the frequency characteristics of the vibration exciting actuator 4 and the vibration system for facilitating the control.

Figure 9:
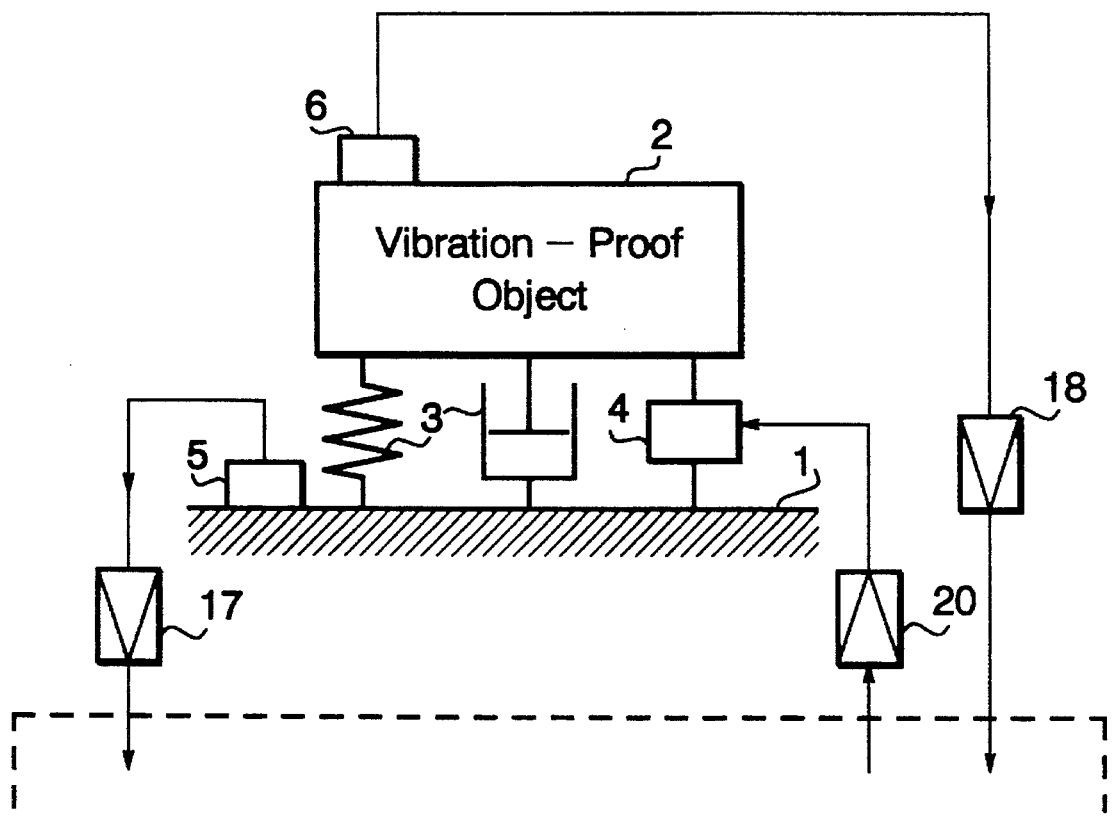
FIG. 9 is a partial view showing the construction of a vibration controller of the other embodiment.

In the above-described embodiments, the vibration exciting actuator 4 may be interposed between the vibration-proof object 2 and the ground 1 as shown in FIG. 9.

According to the present invention, by synthesizing the vibration control through the adaptive filter and the feedback control, the control for the periodic vibration and the control for the natural frequency can be realized without little increasing the calculation amount, and even when the natural frequency is relatively low and the transmissibility of vibration is high, the present invention can be preferably put in practical use. Thus, the present invention makes it possible to reduce vibrations in a wide range.

What is claimed is:

1. A vibration control method of applying a vibration through a vibration exciting means to a vibration-proof object for canceling vibration transmitted from a vibration source, thereby reducing the vibration, said method comprising the steps of:

inputting vibration information of said vibration source as a reference signal and vibration information of said vibration-proof object as an error signal into an adaptive filter, and processing said reference signal by updating a filter coefficient on the basis of a filtered-X LMS algorithm for forming a feedforward control signal;

inputting said vibration information of said vibration-proof object in a feedback calculation means comprising a state space controller, and forming a feedback control signal on the basis of a feedback control rule for damping a vibration system; and synthesizing said feedforward control signal and said feedback control signal to form a drive signal, and applying said drive signal to said vibration exciting means, so as to drive and control said vibration exciting means to synthesize control of periodic vibration of said vibration proof object by said adaptive filter, and synthesize control of vibration at a natural frequency of said vibration-proof object by said feedback calculation means.

2. A vibration control method as claimed in claim 1, wherein said vibration information of said vibration-proof object is inputted into said adaptive filter through a frequency filter or an integrator.

3. A vibration control method as claimed in claim 1, wherein said vibration information of said vibration source is inputted into said adaptive filter through a frequency filter.

4. A vibration control method as claimed in claim 1, wherein said feedforward control signal is filtered by a frequency filter before being synthesized with said feedback control signal.

5. A vibration controller for applying a vibration through a vibration exciting means to a vibration-proof object for canceling vibration transmitted from a vibration source, thereby reducing the vibration, said controller comprising:

a first vibration detecting means for detecting a vibration of said vibration source;

a second vibration detecting means for detecting a vibration of said vibration-proof object;

an adaptive filter for receiving a detection signal from said first vibration detecting means as a reference signal and a detection signal from said second vibration detecting means as an error signal, and updating a filter coefficient on the basis of a filtered-X LMS algorithm for processing said reference signal, thereby forming a feedforward signal;

feedback calculating means comprising a state space controller for receiving a detection signal from said second vibration detecting means, and forming a feedback signal on the basis of a feedback control rule for damping a vibration system; and synthesizing means for synthesizing said feedforward signal and said feedback signal for forming a drive signal, and for applying said drive signal to said vibration exciting means to synthesize control of periodic vibration of said vibration proof object by said adaptive filter and synthesize control of vibration at a natural frequency of said vibration-proof object by said feedback calculating means.

6. A vibration controller as claimed in claim 5, said controller comprising:

a first acceleration sensor for detecting a vibration of said vibration source;

a second acceleration sensor for detecting a vibration of said vibration-proof object;

a first AD converter for converting an analog detection signal of said first acceleration sensor into a first digital signal;

a second AD converter for converting an analog detection signal of said second acceleration sensor into a second digital signal;

an adaptive filter for receiving said first digital signal as a reference signal and said second digital signal as an error signal, and updating a filter coefficient on the basis of Filtered-X-LMS algorithm for processing said reference signal, thereby forming a feedforward signal;

a feedback calculating means for receiving said second digital signal, and forming a feedback signal on the basis of a feedback control rule;

a synthesizing means for synthesizing said feedforward signal and said feedback signal for forming a digital drive signal; and a DA converter for converting said digital drive signal into an analog drive signal for said vibration exciting means.

7. A vibration controller as claimed in claim 5, wherein said vibration exciting means is interposed between said vibration-proof object and the ground.

8. A vibration control method of applying a vibration to a vibration-proof object for canceling a vibration transmitted from a vibration source, thereby reducing the vibration, said method comprising the steps of:

inputting vibration information of said vibration source as a reference signal and vibration information of said vibration-proof object as an error signal into an adaptive filter, and processing said reference signal by updating a filter coefficient on the basis of an adaptive algorithm for forming a feedforward control signal;

inputting said vibration information of said vibration-proof object in a feedback calculation means, and forming a feedback control signal on the basis of a feedback control rule; and synthesizing said feedforward control signal and said feedback control signal, and forming a drive signal for said vibration exciting means, thereby driving and controlling said vibration exciting means wherein said feedforward control signal is filtered by a frequency filter before being synthesized with said feedback control signal.

* * * * *